(12) United States Patent
Luo et al.

(10) Patent No.: US 11,314,454 B2
(45) Date of Patent: Apr. 26, 2022

(54) METHOD AND APPARATUS FOR MANAGING STORAGE DEVICE IN STORAGE SYSTEM

(71) Applicant: HUAWEI TECHNOLOGIES CO., LTD., Guangdong (CN)

(72) Inventors: Dan Luo, Shenzhen (CN); Yu Liu, Shenzhen (CN); Wei Zhang, Shenzhen (CN); Wei Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/912,377

(22) Filed: Jun. 25, 2020

(65) Prior Publication Data

US 2020/0326891 A1    Oct. 15, 2020

Related U.S. Application Data

(63) Continuation of application No. PCT/CN2017/118650, filed on Dec. 26, 2017.

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/067* (2013.01); *G06F 12/10* (2013.01); *G06F 2212/657* (2013.01)

(58) Field of Classification Search
CPC ...... G06F 3/0659; G06F 3/0604; G06F 3/067; G06F 12/10; G06F 2212/657
See application file for complete search history.

(56) References Cited

U.S. PATENT DOCUMENTS

| | | | |
|---|---|---|---|
| 8,595,385 B1 | 11/2013 | Shapiro et al. | |
| 11,086,801 B1* | 8/2021 | Machulsky | ......... G06F 13/4282 |
| 2007/0260714 A1 | 11/2007 | Kalmuk et al. | |
| 2015/0012607 A1 | 1/2015 | Cayton et al. | |
| 2016/0034418 A1 | 2/2016 | Romem et al. | |
| 2016/0057224 A1 | 2/2016 | Ori | |
| 2016/0210062 A1 | 7/2016 | McCambridge et al. | |
| 2016/0217104 A1* | 7/2016 | Kamble | ................ G06F 3/0632 |
| 2018/0234503 A1 | 8/2018 | Lan et al. | |

FOREIGN PATENT DOCUMENTS

| | | |
|---|---|---|
| CN | 102388357 A | 3/2012 |
| CN | 102968498 A | 3/2013 |
| CN | 103064797 A | 4/2013 |
| CN | 103634379 A | 3/2014 |

(Continued)

*Primary Examiner* — Gary W. Cygiel

(57) ABSTRACT

In a method for accessing a storage system, a client in the storage system identifies a logical address of a storage device, and queries a management server regarding a mapping between the storage device and a start address of a submission queue (SQ) in the memory of the storage node. The client then sends an access request including the logical address of the storage device directed to the start address of the SQ to a network interface card NIC of the storage node. The NIC receives and sends the access request to the start address of the SQ in the memory. The storage device obtains the access request from the start address of the SQ and executes the access request.

12 Claims, 11 Drawing Sheets

(56) References Cited

FOREIGN PATENT DOCUMENTS

| | | | |
|---|---|---|---|
| CN | 104111907 | A | 10/2014 |
| CN | 104951252 | A | 9/2015 |
| CN | 105989048 | A | 10/2016 |
| CN | 107111596 | A | 8/2017 |
| CN | 107229415 | A | 10/2017 |
| EP | 3147792 | A1 | 3/2017 |
| EP | 3220282 | A1 | 9/2017 |

* cited by examiner

```
┌─────────────────────────────────────────────┐
│ A storage node allocates a memory address   │
│ in a memory 202 to a queue                  │~ 701
└─────────────────────────────────────────────┘
                      │
┌─────────────────────────────────────────────┐
│ The storage node sends a queue message to a │~ 702
│ management server                           │
└─────────────────────────────────────────────┘
```

FIG. 7

| Identifier of a storage node | Identifier of an NVMe storage device | Start address of a queue |
|---|---|---|
| N1 | D11 | Add1 |
| ... | ... | ... |
| N1 | D11 | Addn |
| N1 | D12 | Addm |
| ... | ... | ... |
| N1 | D12 | Addf |
| N2 | D21 | Addk |
| ... | ... | ... |
| N2 | D22 | Addg |
| N3 | D31 | Addy |
| ... | ... | ... |
| N4 | D41 | Addz |
| ... | ... | ... |

FIG. 8

| Identifier of a storage node | Identifier of an NVMe storage device | Start address of a queue |
|---|---|---|
| N2 | D21 | Addk |
| ... | ... | ... |
| N2 | D21 | Addg |
| N3 | D31 | Addy |
| ... | ... | ... |
| N4 | D41 | Addz |
| ... | ... | ... |

| Identifier of a storage node | Identifier of an NVMe storage device | Start address of a queue |
|---|---|---|
| N1 | D12 | Addm |
| ... | ... | ... |
| N1 | D12 | Addf |
| N2 | D21 | Addk |
| ... | ... | ... |
| N2 | D21 | Addg |
| N3 | D31 | Addy |
| ... | ... | ... |
| N4 | D41 | Addz |
| ... | ... | ... |

FIG. 11

| Identifier of an NVMe storage device | Start address of a queue |
|---|---|
| D11 | Addm |
| ... | ... |
| D12 | Addf |
| ... | ... |

FIG. 12

METHOD AND APPARATUS FOR MANAGING STORAGE DEVICE IN STORAGE SYSTEM

CROSS-REFERENCE TO RELATED APPLICATIONS

This application is a continuation of International Application No. PCT/CN2017/118650, filed on Dec. 26, 2017, which is hereby incorporated by reference in its entirety.

TECHNICAL FIELD

The present disclosure relates to the field of information technologies, and in particular, to a method and an apparatus for managing a storage device in a storage system.

BACKGROUND

With development of the non-volatile memory express (NVMe) interface specification, a storage device that supports the NVMe interface specification (briefly referred to as an NVMe storage device below) is applied to a distributed storage system. The distributed storage system usually includes a plurality of storage nodes. Each storage node includes one or more storage devices that support the NVMe interface specification. A client accesses the storage device in the distributed storage system. First, the client needs to determine a storage node that processes an access request, and establish communication with the storage node; the storage node receives the access request; and a central processing unit (CPU) of the storage node parses the access request to obtain an access command, converts an address in the access request into a storage address of an NVMe storage device, determines an NVMe storage device corresponding to the access request, and sends the storage address of the NVMe storage device and the access command to the corresponding NVMe storage device. The foregoing operation process is the same as a process of accessing a conventional storage device that does not support the NVMe interface specification, and therefore performance of the NVMe storage device cannot be brought into full play.

SUMMARY

This disclosure provides a method and an apparatus for managing a storage device in a storage system.

A first aspect of this disclosure provides a method for managing a storage device in a storage system, where the storage system includes a management server and a first storage node, the first storage node includes a first storage device that supports the NVMe interface specification, and a start address of a queue of the first storage device is located in a first memory address in a first memory of the first storage node; and the method includes: obtaining, by the management server, a first queue message from the first storage node, where the first queue message includes an identifier of the first storage node and the first memory address; establishing, by the management server, a first mapping relationship between the identifier of the first storage node and the first memory address; receiving, by the management server, a query request from a client, where the query request includes the identifier of the first storage node; and sending, by the management server, a query request response to the client based on the first mapping relationship, where the query request response includes the first memory address. The management server establishes a mapping relationship between an identifier of a storage node and a start address of a queue, and the client can obtain queue information of an NVMe storage device from the management server, so that the client can directly access the NVMe storage device, and a CPU of the storage node does not need to participate in processing an access request. Therefore, performance of the NVMe storage device is brought into full play, and write performance of the storage system is improved.

With reference to the first aspect of this disclosure, in a first possible implementation, the method further includes: establishing, by the management server, a lock identifier, where the lock identifier is used to lock the first memory address. Therefore, the management server may record a queue allocation status. Further, the management server may collect statistics about load of the NVMe storage device based on lock information. Further, the management server may further record an identifier of a client that obtains a queue.

With reference to the first aspect of this disclosure, in a second possible implementation, the storage system further includes a second storage node, the second storage node includes a second storage device that supports the NVMe interface specification, and a start address of a queue of the second storage device is located in a second memory address in a second memory of the second storage node; and the method further includes: obtaining, by the management server, a second queue message of the second storage device from the second storage node, where the second queue message includes an identifier of the second storage node and the second memory address; and establishing, by the management server, a second mapping relationship between the identifier of the second storage node and the second memory address. The management server can manage queue information of NVMe storage devices included in all storage nodes in a storage queue.

With reference to the first aspect of this disclosure, or the first or the second possible implementation of the first aspect, in a third possible implementation, the method further includes: obtaining, by the management server, a third queue message from the first storage node, where the third queue message includes the identifier of the first storage node and a third memory address; and establishing, by the management server, a third mapping relationship between the identifier of the first storage node and the third memory address, where a start address of a queue of a third storage device that supports the NVMe interface specification is located in the third memory address in the first memory, and the third storage device is a newly added storage device in the first storage node.

With reference to the second or the third possible implementation of the first aspect of this disclosure, in a fourth possible implementation, the method further includes: receiving, by the management server, a queue information deletion message from the second storage node, where the queue information deletion message includes the second memory address; and deleting, by the management server, the second mapping relationship.

With reference to the first aspect of this disclosure, in a fifth possible implementation, the method further includes: detecting, by the management server, that communication with the first storage node is interrupted; and deleting, by the management server, the first mapping relationship.

With reference to the fifth possible implementation of the first aspect of this disclosure, in a sixth possible implementation, the detecting, by the management server, that communication with the first storage node is interrupted specifically includes: detecting, by the management server, that a heartbeat of the first storage node is not received within a predetermined time.

A second aspect of this disclosure provides a method for managing a storage device in a storage system, where the storage system includes a management server and a storage node, and the storage node includes a first storage device that supports the NVMe interface specification; and the method includes: allocating, by the storage node, a first memory address in a memory to a start address of a queue of the first storage device; and sending, by the storage node, a first queue message to the management server, where the first queue message includes an identifier of the storage node and the first memory address. The storage node sends queue information of the storage device to the management server, so that a client can directly access the storage device by using the queue information.

With reference to the second aspect of this disclosure, in a first possible implementation, the method further includes: detecting, by the storage node, that the first storage device is installed to the storage node.

With reference to the second aspect of this disclosure or the first possible implementation of the second aspect, in a second possible implementation, the method further includes: detecting, by the storage node, that the first storage device is removed from the storage node; and sending, by the storage node, a queue information deletion message to the management server, where the queue information deletion message includes the first memory address.

A third aspect of this disclosure provides a method for managing a storage device in a storage system, where the storage system includes a management server and a first storage node, the first storage node includes a first storage device that supports the NVMe interface specification, a start address of a queue of the first storage device is located in a first memory address in a first memory of the first storage node, and the management server stores a first mapping relationship between an identifier of the first storage node and the first memory address; and the method includes: sending, by a client, a query request to the management server, where the query request includes the identifier of the first storage node; and receiving, by the client, a query request response from the management server, where the query request response includes the first memory address that is determined by the management server based on the first mapping relationship. The client queries the management server, and can obtain queue information of an NVMe storage device in a storage node, so that the client can directly access the NVMe storage device based on the queue information, and participation of a CPU of the storage node is not needed. Therefore, performance of the NVMe storage device is brought into full play.

With reference to the third aspect of this disclosure, in a first possible implementation, the method further includes: sending, by the client, a first remote direct memory access request to the first storage node, where the first remote direct memory access request includes the first memory address.

With reference to the first possible implementation of the third aspect of this disclosure, in a second possible implementation, the storage system further includes a second storage node, the second storage node includes a second storage device that supports the NVMe interface specification, and a start address of a queue of the second storage device is located in a second memory address in a second memory of the second storage node; the management server stores a second mapping relationship between an identifier of the second storage node and the second memory address; the query request includes the identifier of the second storage node; the query request response includes the second memory address that is determined by the management server based on the second mapping relationship; the first storage device and the second storage device form a stripe relationship; and the method further includes: sending, by the client, a second remote direct memory access request to the second storage node, where the second remote direct memory access request includes the second memory address.

With reference to the method for managing a storage device in a storage system in any one of the first aspect of this disclosure, or the first to the sixth possible implementations of the first aspect, a fourth aspect of this disclosure further provides a management server, where the management server includes a plurality of units, configured to perform any one of the first aspect of this disclosure, or the first to the sixth possible implementations of the first aspect.

With reference to the method for managing a storage device in a storage system in any one of the second aspect of this disclosure, or the first and the second possible implementations of the second aspect, a fifth aspect of this disclosure further provides a storage node, where the storage node includes a plurality of units, configured to perform any one of the second aspect of this disclosure, or the first and the second possible implementations of the second aspect.

With reference to the method for managing a storage device in a storage system in any one of the third aspect of this disclosure, or the first and the second possible implementations of the third aspect, a sixth aspect of this disclosure further provides a client, where the client includes a plurality of units, configured to perform any one of the third aspect of this disclosure, or the first and the second possible implementations of the third aspect.

A seventh aspect of this disclosure further provides a management server, applied to the storage system in any one of the first aspect of this disclosure, or the first to the sixth possible implementations of the first aspect, where the management server includes a processor and an interface, the processor communicates with the interface, and the processor is configured to perform any one of the first aspect of this disclosure, or the first to the sixth possible implementations of the first aspect.

An eighth aspect of this disclosure further provides a storage node, applied to the storage system in any one of the second aspect of this disclosure, or the first and the second possible implementations of the second aspect, where the storage node includes a processor and an interface, the processor communicates with the interface, and the processor is configured to perform any one of the second aspect of this disclosure, or the first and the second possible implementations of the second aspect.

A ninth aspect of this disclosure further provides a client, applied to the storage system in any one of the third aspect of this disclosure, or the first and the second possible implementations of the third aspect, where the client includes a processor and an interface, the processor communicates with the interface, and the processor is configured to perform any one of the third aspect of this disclosure, or the first and the second possible implementations of the third aspect.

Correspondingly, a tenth aspect of this disclosure further provides a computer readable storage medium and a computer program product, where the computer readable storage medium and the computer program product include a computer instruction, to implement the solutions in the first aspect of this disclosure.

Correspondingly, an eleventh aspect of this disclosure further provides a computer readable storage medium and a computer program product, where the computer readable storage medium and the computer program product include a computer instruction, to implement the solutions in the second aspect of this disclosure.

Correspondingly, a twelfth aspect of this disclosure further provides a computer readable storage medium and a computer program product, where the computer readable storage medium and the computer program product include a computer instruction, to implement the solutions in the third aspect of this disclosure.

BRIEF DESCRIPTION OF DRAWINGS

FIG. 7 is a flowchart of sending queue information by a storage node according to an embodiment of the present invention;

FIG. 8 is a schematic diagram of storing queue information of an NVMe storage device by a management server according to an embodiment of the present invention;

FIG. 11 is a schematic diagram of storing queue information of an NVMe storage device by a management server according to an embodiment of the present invention;

FIG. 12 is a schematic diagram of storing queue information of an NVMe storage device by a storage node according to an embodiment of the present invention;

EMBODIMENTS OF THE PRESENT INVENTION

A storage system in embodiments of the present invention may be applied to a storage array (for example, the Huawei® OceanStor® 18000 series or Dorado® V3 series), a distributed file storage system (for example, the Huawei® OceanStor® 9000 series), a distributed block storage system (for example, the Huawei® FusionStorage® series), a distributed object storage system or a distributed storage system supporting a log-structured interface, or the like.

Figure 1:
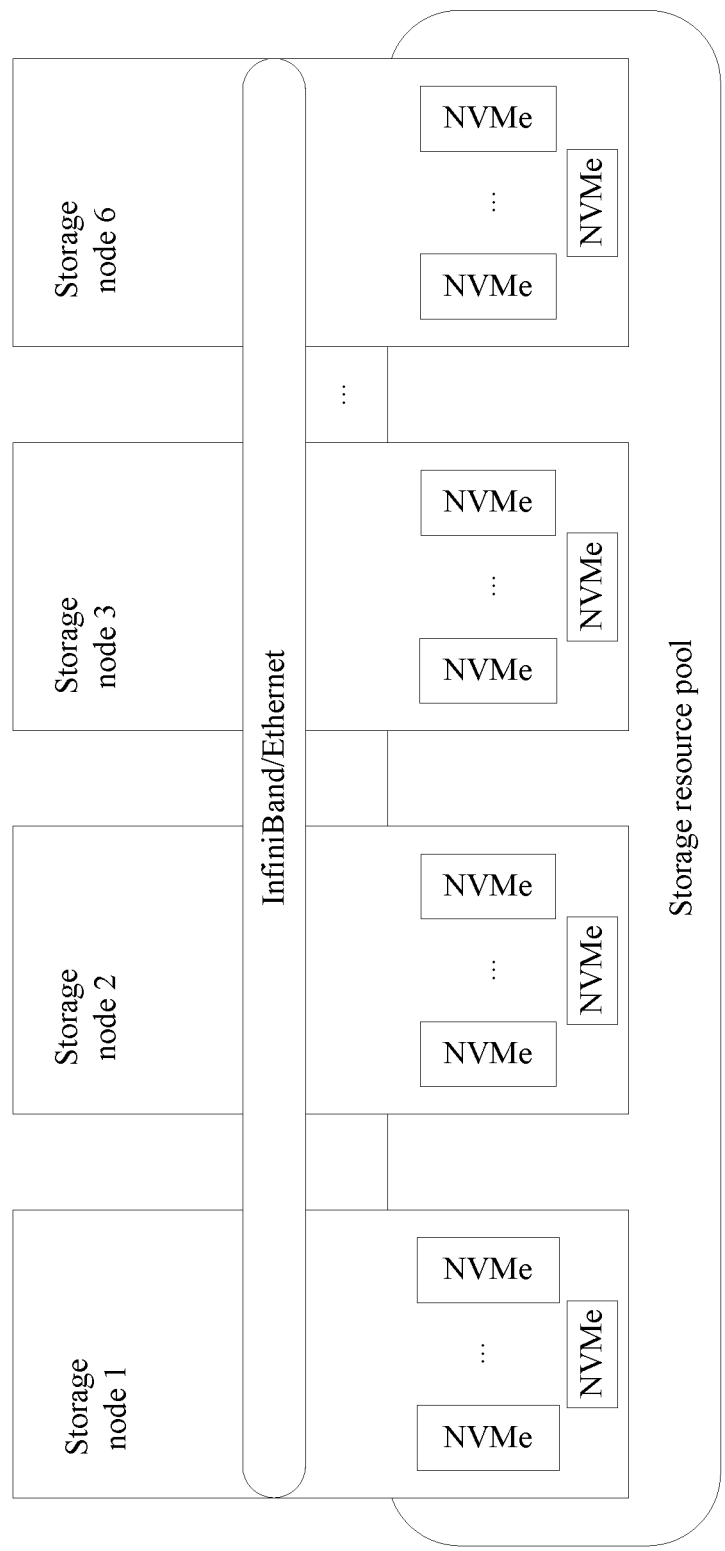
FIG. 1 is a schematic diagram of a distributed block storage system according to an embodiment of the present invention.

FIG. 1 shows a distributed block storage system according to an embodiment of the present invention, for example, the Huawei® FusionStorage® series. The distributed block storage system includes a plurality of storage nodes, such as a storage node 1, a storage node 2, a storage node 3, a storage node 4, a storage node 5, and a storage node 6. The storage nodes communicate with each other by using InfiniBand, Ethernet, or the like. During actual application, a quantity of storage nodes in the distributed block storage system may be increased depending on an actual requirement. This is not limited in this embodiment of the present invention. Each storage node includes one or more NVMe storage devices, for example, a solid state disk (SSD) that supports the NVMe interface specification. In this embodiment of the present invention, the NVMe storage device is not limited to the SSD. In this embodiment of the present invention, specifically, the NVMe storage device may be included inside the storage node, or the NVMe storage device may be disposed outside the storage node in a form of Just a Bunch Of Disks (JBOD).

Figure 2:
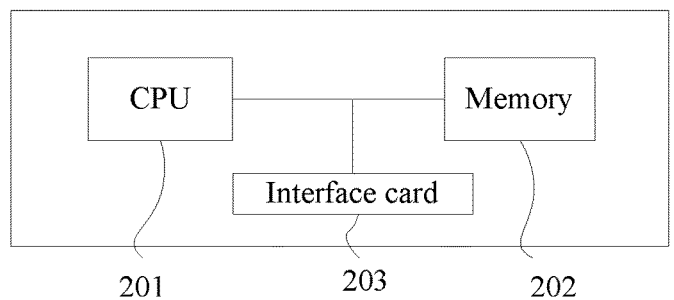
FIG. 2 is a schematic structural diagram of a storage node according to an embodiment of the present invention.

The storage node includes a structure shown in FIG. 2. As shown in FIG. 2, the storage node includes a central processing unit (CPU) 201, a memory 202, and an interface card 203. The memory 202 stores a computer instruction, and the CPU 201 executes the computer instruction in the memory 202 to perform a corresponding operation. The interface card 203 may be a network interface card (NIC), an InfiniBand protocol interface card, or the like. In addition, to save computing resources of the CPU 201, a field programmable gate array (FPGA) or other hardware may take the place of the CPU 301 to perform the foregoing corresponding operation, or an FPGA or other hardware performs the foregoing corresponding operation together with the CPU 201. For ease of description, in this embodiment of the present invention, a combination of the CPU 201 and the memory 202, the FPGA or other hardware that takes the place of the CPU 201, and a combination of the CPU 201 and the FPGA or other hardware that takes the place of the CPU 201 are all collectively referred to as a processor.

In the structure shown in FIG. 2, a client may be a device independent of the storage node shown in FIG. 2, for example, a server or a mobile device, or may be a virtual machine (Virtual Machine, VM). The client runs an application program, and the application program may be a VM or a container, or may be a particular application, for example, office software. The client writes data into or reads data from distributed block device storage. For a structure of the client, refer to FIG. 2 and the related description.

Figure 3:
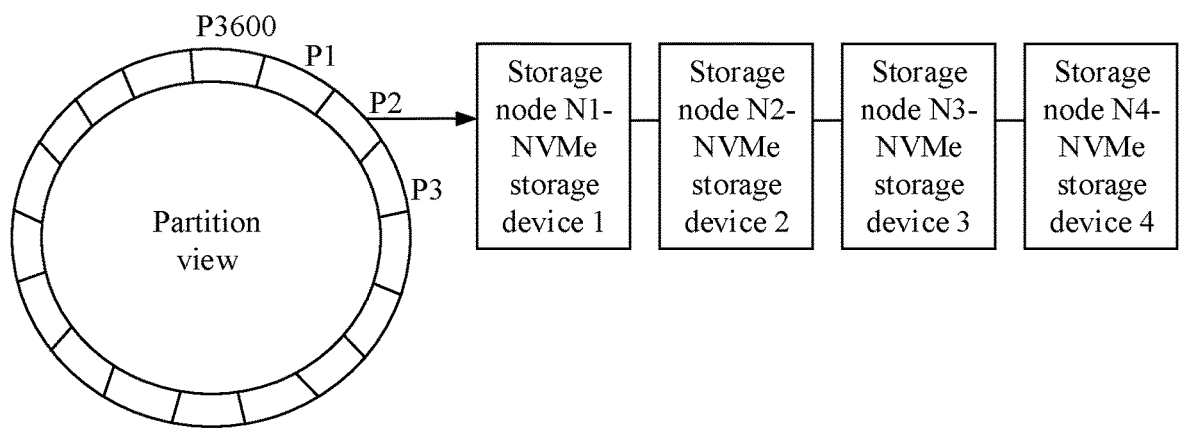
FIG. 3 is a partition view according to an embodiment of the present invention.

A distributed block storage system program is loaded in the memory 202 of the storage node. The CPU 201 executes the distributed block storage system program in the memory 202, provides a block protocol access interface for the client, and provides a distributed block storage access point service for the client, so that the client accesses a storage resource in a storage resource pool in the distributed block storage system. Usually, the block protocol access interface is used to provide a logical unit for the client. For example, during initialization of the distributed block storage system, hash space (for example, 0 to $2^{32}$) is divided into N equal parts, each equal part is one partition, and the N equal parts are evenly distributed based on a quantity of hard disks. For example, N is 3600 by default in the distributed block storage system. To be specific, the partitions are P1, P2, P3, . . . , and P3600. Assuming that there are 18 NVMe storage devices currently in the distributed block storage system, each NVMe storage device carries 200 partitions. A partition P includes a total of M NVMe storage devices that are respectively distributed in M storage nodes, and the M NVMe storage devices in the partition form a stripe relationship. The stripe relationship may be multi-copying or erasure coding (EC). A correspondence between a partition and an NVMe storage device, to be specific, a mapping relationship between a partition and an NVMe storage device included in the partition, is also referred to as a partition view. As shown in FIG. 3, for example, a partition includes four NVMe storage devices, and a partition view is "P2-(storage node N1-NVMe storage device 1)-(storage node N2-NVMe storage device 2)-(storage node N3-NVMe storage device 3)-(storage node N4-NVMe storage device 4)". To be specific, the NVMe storage device 1, the NVMe storage device 2, the NVMe storage device 3, and the NVMe storage device 4 form a stripe relationship. When each storage node includes only one NVMe storage device, the partition view shown in FIG. 3 may also be indicated as P2-storage node N1-storage node N2-storage node N3-storage node N4. Usually, partition division and partition view allocation are implemented by a management server. The management server completes partition view allocation during initialization of the distributed block storage system, and makes an adjustment subsequently depending on a change of a quantity of NVMe storage devices in the distributed block storage system. For a structure of the management server, refer to the structure shown in FIG. 2. To facilitate access of the client and reduce access pressure on the management server, in an implementation, the management server sends the partition view to the client.

The distributed block storage system provides a volume for the client as a storage resource. During specific implementation, in the distributed block storage system, logical addresses of the NVMe storage devices are grouped into a resource pool, to provide data access for the client. A storage address in an access request received by the client is mapped to the logical address of the NVMe storage device. To be specific, a data block in which the storage address in the access request of the client is located is mapped to the logical address provided by the NVMe storage device. An access request used by the client to access the volume, for example, a write request, includes a storage address and data. In the distributed block storage system, the storage address is a logical block address (LBA). A data block corresponding to the write request is determined based on the storage address in the write request. The client queries, based on the data block, the partition view in the management server or a partition view locally stored by the client, and determines an NVMe storage device that allocates storage space to the data block. For example, it is assumed that a size of the data block is 1024 bytes, and a data block in the volume is numbered from 0. The storage address included in the write request is a write start address and is 1032 bytes, and a size of the to-be-written data is 64 bytes. The write request is located in a data block numbered 1 (1032/1324), and an internal offset of the data block is 8 (1032%1024).

For example, as shown in FIG. 3, a first data block is distributed in the partition P2, and the NVMe storage device 1, the NVMe storage device 2, the NVMe storage device 3, and the NVMe storage device 4 form a stripe relationship, that is, a multi-copying relationship. The client queries the partition view, and determines a logical address that is of an NVMe storage device and to which the storage address included in the write request is mapped. For example, logical addresses that are of the NVMe storage device 1, the NVMe storage device 2, the NVMe storage device 3, and the NVMe storage device 4 and to which the storage address is mapped are L1, L2, L3, and L4, respectively. During specific implementation, the client queries the partition view for a master storage node, for example, the storage node N1, based on the partition view, and the storage node N1 provides L1, L2, L3, and L4 for the client. The client determines the NVMe storage devices that provide the logical addresses, and obtains memory addresses, in a memory, of start addresses of queues (briefly referred to as the start addresses of the queues below) of the NVMe storage device 1, the NVMe storage device 2, the NVMe storage device 3, and the NVMe storage device 4. For specific implementation in which the client obtains the memory addresses, in the memory, of the start addresses of the queues of the NVMe storage devices, refer to the following description. The client sends RDMA write requests to the NVMe storage device 1, the NVMe storage device 2, the NVMe storage device 3, and the NVMe storage device 4, respectively. The RDMA write request sent to the NVMe storage device 1 by the client includes the logical address L1 and the start address of the queue of the NVMe storage device 1, and further includes data that is to be written into L1 and that is in a write request received by the client. The RDMA write request sent to the NVMe storage device 2 by the client includes the logical address L2 and the start address of the queue of the NVMe storage device 2, and further includes data that is to be written into L2 and that is in the write request received by the client. The RDMA write request sent to the NVMe storage device 3 by the client includes the logical address L3 and the start address of the queue of the NVMe storage device 3, and further includes data that is to be written into L3 and that is in the write request received by the client. The RDMA write request sent to the NVMe storage device 4 by the client includes the logical address L4 and the start address of the queue of the NVMe storage device 4, and further includes data that is to be written into L4 and that is in the write request received by the client. During specific implementation, the client respectively sends the RDMA write requests to an interface card of the storage node 1 in which the NVMe storage device 1 is located, an interface card of the storage node 2 in which the NVMe storage device 2 is located, an interface card of the storage node 3 in which the NVMe storage device 3 is located, and an interface card of the storage node 4 in which the NVMe storage device 4 is located.

Figure 4:
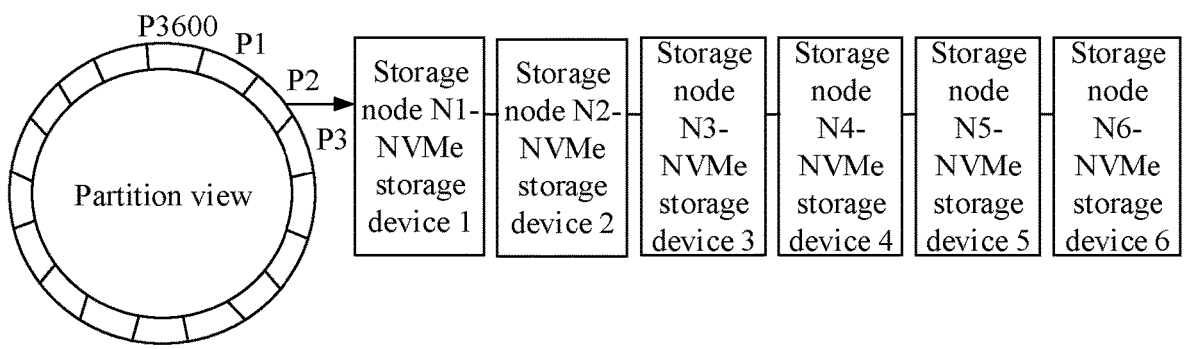
FIG. 4 is a partition view according to an embodiment of the present invention.

In another implementation, as shown in FIG. 4, the partition view is P2-(storage node N1-NVMe storage device 1)-(storage node N2-NVMe storage device 2)-(storage node N3-NVMe storage device 3)-(storage node N4-NVMe storage device 4)-(storage node N5-NVMe storage device 5)-(storage node N6-NVMe storage device 6). A first data block is distributed in the partition P2. The NVMe storage device 1, the NVMe storage device 2, the NVMe storage device 3, the NVMe storage device 4, the NVMe storage device 5, and the NVMe storage device 6 form an EC relationship. The NVMe storage device 1, the NVMe storage device 2, the NVMe storage device 3, and the NVMe storage device 4 are storage devices that store data slices. The NVMe storage device 5 and the NVMe storage device 6 are storage devices that store parity slices. If a length of an EC stripe is 12 kilobytes (KB), a length of the data slice and a length of the parity slice are both 2 KB. For example, in a first stripe, the NVMe storage device 1, the NVMe storage device 2, the NVMe storage device 3, and the NVMe storage device 4 store data slices whose storage addresses are 0 to 2 KB-1, 2 KB to 4 KB-1, 4 KB to 6 KB-1, and 6 KB to 8 KB-1, respectively, and the NVMe storage device 5 and the NVMe storage device 6 store parity slices of the first stripe, respectively. In a second stripe of the partition, the NVMe storage device 1, the NVMe storage device 2, the NVMe storage device 3, and the NVMe storage device 4 store data slices whose storage addresses are 8 KB to 10 KB-1, 10 KB to 12 KB-1, 12 KB to 14 KB-1, and 14 KB to 16 KB-1, respectively, and the NVMe storage device 5 and the NVMe storage device 6 store parity slices of the second stripe, respectively. For example, the client receives a write request, and a storage address SA included in the write request is 0 to 8 KB-1. The client queries the partition view, determines that a logical address of the NVMe storage device 1 corresponding to a first data slice whose storage address is 0 to 2 KB-1 is L1, determines that a logical address of the NVMe storage device 2 corresponding to a second data slice whose storage address is 2 KB to 4 KB-1 is L2, determines that a logical address of the NVMe storage device 3 corresponding to a third data slice whose storage address is 4 KB to 6 KB-1 is L3, determines that a logical address of the NVMe storage device 4 corresponding to a fourth data slice whose storage address is 6 KB to 8 KB-1 is L4, determines that a logical address of the NVMe storage device 5 corresponding to a first parity slice of the first stripe is L5, and determines that a logical address of the NVMe storage device 6 corresponding to a second parity slice of the first stripe is L6. For specific implementation in which the client queries the partition view, refer to the foregoing description in this embodiment of the present invention. Details are not described herein again. In this embodiment of the present invention, the storage addresses SA are mapped to L1, L2, L3, L4, L5, and L6, respectively. The client determines the NVMe storage devices that provide the logical addresses. The client obtains start addresses of queues of the NVMe storage device 1, the NVMe storage device 2, the NVMe storage device 3, the NVMe storage device 4, the NVMe storage device 5, and the NVMe storage device 6. For specific implementation in which the client obtains the start addresses of the queues of the NVMe storage devices, refer to the following description. The client sends RDMA requests to the NVMe storage device 1, the NVMe storage device 2, the NVMe storage device 3, the NVMe storage device 4, the NVMe storage device 5, and the NVMe storage device 6, respectively. The RDMA write request sent to the NVMe storage device 1 by the client includes the logical address L1 and the start address of the queue of the NVMe storage device 1, and further includes the first data slice that is to be written into L1 and that is in a write request received by the client. The RDMA write request sent to the NVMe storage device 2 by the client includes the logical address L2 and the start address of the queue of the NVMe storage device 2, and further includes the second data slice that is to be written into L2 and that is in the write request received by the client. The RDMA write request sent to the NVMe storage device 3 by the client includes the logical address L3 and the start address of the queue of the NVMe storage device 3, and further includes the third data slice that is to be written into L3 and that is in the write request received by the client. The RDMA write request sent to the NVMe storage device 4 by the client includes the logical address L4 and the start address of the queue of the NVMe storage device 4, and further includes the fourth data slice that is to be written into L4 and that is in the write request received by the client. The RDMA write request sent to the NVMe storage device 5 by the client includes the logical address L5 and the start address of the queue of the NVMe storage device 5, and further includes the first parity slice. The RDMA write request sent to the NVMe storage device 6 by the client includes the logical address L6 and the start address of the queue of the NVMe storage device 6, and further includes the second parity slice.

In the foregoing implementation, the client directly writes data into a start address, in a memory of a storage node, of a queue of an NVMe storage device by using an RDMA write request, and a CPU of the storage node does not need to participate in processing of a write request sent by the client. Therefore, performance of the NVMe storage device is brought into full play, and write performance of the storage system is improved.

In another implementation, the distributed block storage system provides a volume for the client as a storage resource. During specific implementation, in the distributed block storage system, logical addresses of the NVMe storage devices are grouped into a resource pool, to provide data access for the client. To be specific, a data block in which the storage address in the access request of the client is located is mapped to the logical address provided by the NVMe storage device, and no partition view is needed. Mapping between the data block and the logical address provided by the NVMe storage device may be indicated as: the data block-the NVMe storage device-the logical address.

Figure 5:
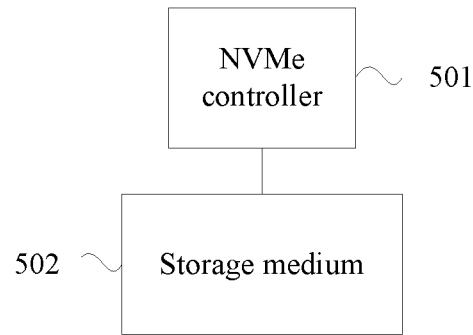
FIG. 5 is a schematic diagram of an NVMe storage device according to an embodiment of the present invention.
Figure 6:
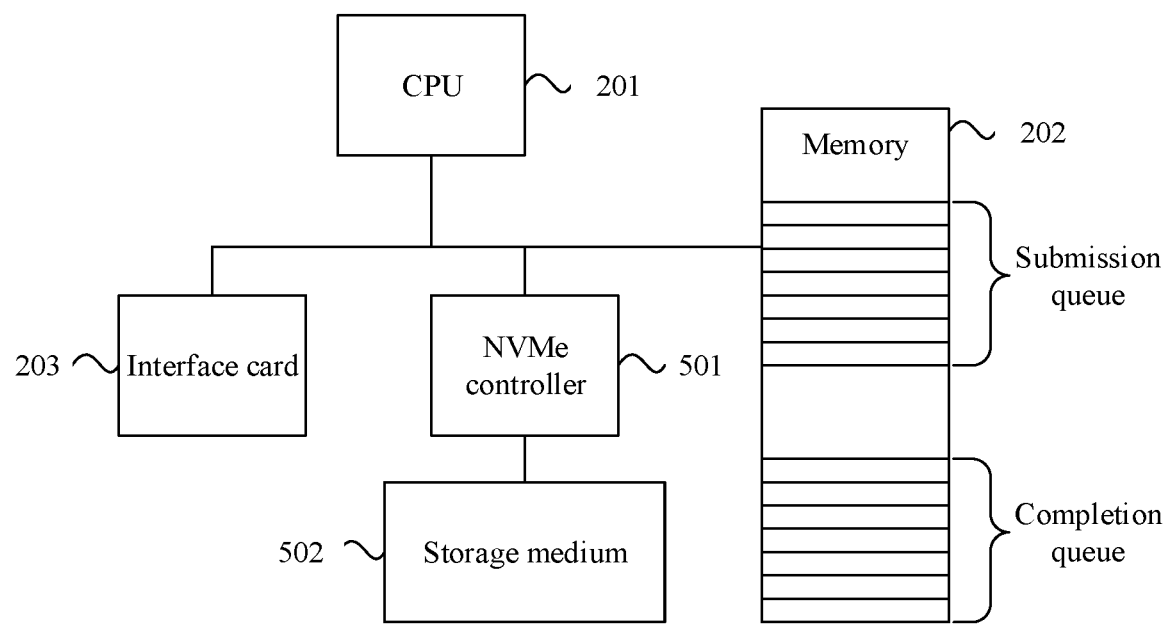
FIG. 6 is a schematic diagram of an NVMe queue in a storage node according to an embodiment of the present invention.

To further describe this embodiment of the present invention, as shown in FIG. 5, the NVMe storage device includes an NVMe controller 501 and a storage medium 502. The NVMe specification defines three key components for processing an access request and data: a submission queue (SQ), a completion queue (CQ), and a Doorbell Register (DB). The SQ is used to store an access request sent by the client. The CQ is used to store a result of processing the access request by the NVMe storage device. The SQ and the CQ exist in a form of a queue pair. As shown in FIG. 6, the SQ and the CQ are located in the memory 202 of the storage node. In this embodiment of the present invention, an SQ and CQ pair is referred to as a queue. A maximum quantity of queues for processing the access request in the NVMe storage device may be up to 65535. Both the SQ and the CQ are circular queues. The NVMe controller obtains a to-be-processed access request from a head of the SQ, and a tail of the SQ is used to store an access request that is most recently sent by the client. The client obtains an access result from a head of the CQ, and a tail of the CQ is used to store a result of an access request that is most recently processed by the NVMe controller. When accessing the NVMe storage device by using an RDMA request, the client needs to obtain the tails of the SQ and the CQ of the NVMe storage device, to be specific, memory addresses, in the memory 202, of start addresses of the SQ and the CQ. There are registers in the NVMe controller, to record locations of the heads and the tails of the SQ and the CQ. Each SQ or CQ has two corresponding registers: a head register and a tail register.

Usually, the head register is also referred to as a head doorbell (DB), and the tail register is also referred to as a tail DB. A function of the DB is described in detail in subsequent embodiments.

The NVMe storage device is connected to the storage node. After the storage node is started, the NVMe storage device registers with the storage node. As shown in FIG. 7, the storage node performs the following procedure.

Step 701: The storage node allocates a memory address in the memory 202 to a queue.

The allocating, by the storage node, a memory address in the memory 202 to a queue includes: allocating a memory address in the memory to a start address of the queue.

Step 702: The storage node sends a queue message to a management server, where the queue message includes an identifier of the storage node and a start address of the queue.

The storage node locally establishes a mapping relationship between the identifier of the storage node and the start address of the queue. The storage node may include one or more NVMe storage devices. The queue message may further include an identifier of the NVMe storage device, to distinguish between start addresses of queues of different NVMe storage devices in the storage node. When the storage node includes only one NVMe storage device, the queue message may include only the identifier of the storage node and the start address of the queue.

When a new NVMe storage device is connected to the storage node in a running process of the storage node, the storage node also performs the procedure shown in FIG. 7.

Further, the storage node detects that the NVMe storage device is removed from the storage node, and the storage node sends a queue information deletion message to the management server, where the queue information deletion message includes the start address of the queue. That the NVMe storage device is removed from the storage node may specifically include that the NVMe storage device is physically removed or the NVMe storage device is faulty. The storage node may detect a driver of the NVMe storage device, to determine whether the NVMe storage device is removed from the storage node.

The management server obtains queue information from the storage node. During specific implementation, the management server may send a request to the storage node, to instruct the storage node to report the queue information, or the storage node may actively send the queue information to the management server. The queue information includes the identifier of the storage node and a start address that is allocated by the storage node to a queue of the NVMe storage device. The management server establishes a mapping relationship between the identifier of the storage node and the start address of the queue. Usually, the storage node includes a plurality of NVMe storage devices. To distinguish between start addresses of queues of different NVMe storage devices in a same storage node, the queue information further includes identifiers of the NVMe storage devices, and the mapping relationship established by the management server further includes the identifiers of the NVMe storage devices. In an implementation, the foregoing mapping relationship is stored as entries in a table shown in FIG. 8. In other words, the mapping relationship may be stored by using an entry structure shown in FIG. 8 or another data structure that can reflect a relationship between an identifier and an address. N1, N2, and N3 indicate identifiers of storage nodes. D11 and D12 indicate identifiers of NVMe storage devices in the storage node 1. Add1 indicates a start address of a queue of an NVMe storage device whose identifier is D11. The NVMe storage device whose identifier is D11 may have a plurality of queues. Therefore, in an implementation, Add1 indicates a start address of an SQ of the NVMe storage device; in another implementation, Add1 may alternatively indicate start addresses of queues (a start address of an SQ and a start address of a CQ) of the NVMe storage device. For meanings of other items in the table shown in FIG. 8, refer to the foregoing description. The mapping relationship between the identifier of the storage node and the start address of the queue is used as the entries in the table shown in FIG. 8. In the storage system, each storage node has a unique identifier. The identifier may be a number allocated to the storage node by the management server, or may be hardware information of the storage node, for example, interface card hardware information, or may be address information of the storage node, for example, an Internet Protocol (IP) address. The identifier of the NVMe storage device may be hardware information of the NVMe storage device, or may be an internal number in the storage node in which the NVMe storage device is located. For example, the NVMe storage device in the storage node 1 may be identified by D11 or D12, or may be indicated as N1+NVMe storage device number, for example, N1+1 or N1+2. The management server establishes a mapping relationship between an identifier of a storage node and a start address of a queue, and the client can obtain queue information of an NVMe storage device from the management server, so that the client can directly access the NVMe storage device, and participation of a CPU of the storage node is not needed. Therefore, performance of the NVMe storage device is brought into full play.

Figures 9, 10:
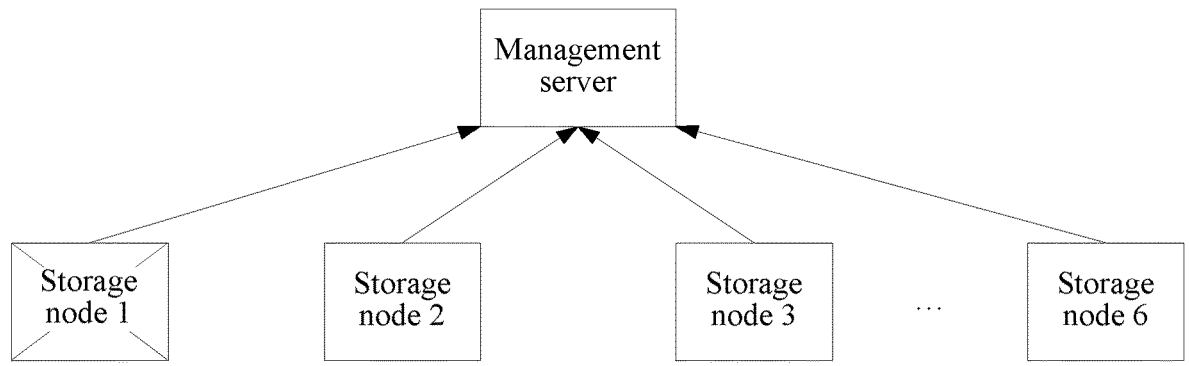
FIG. 9 is a schematic diagram of communication between a management server and a storage node according to an embodiment of the present invention.
FIG. 10 is a schematic diagram of storing queue information of an NVMe storage device by a management server according to an embodiment of the present invention.

In an implementation, as shown in FIG. 9, the management server communicates with the storage node, and determines whether the storage node is normal, for example, determines, by regularly receiving a heartbeat from the storage node, whether the storage node is normal. For example, if the management server has not received a heartbeat of the storage node within a predetermined time, the management server determines that communication with the storage node is interrupted and that the storage node becomes faulty. For example, if the management server has not received, within the predetermined time, a heartbeat sent by the storage node 1 shown in FIG. 9, the management server determines that communication with the storage node 1 is interrupted and that the storage node 1 becomes faulty. With reference to FIG. 8, the management server deletes an entry related to the storage node 1 that is recorded in the table, that is, mapping information. After the entry related to the storage node 1 is deleted, the table is shown in FIG. 10. After the storage node 1 is restored, the procedure shown in FIG. 7 is performed.

The NVMe storage device is removed from the storage node, the management server receives a queue information deletion message from the storage node, and the queue information deletion message includes the start address of the queue. For example, the NVMe storage device whose identifier is D11 is removed from the storage node 1, and the storage node 1 sends the queue information deletion message to the management server. As shown in FIG. 11, the management server deletes all mapping relationships including the identifier D11 shown in FIG. 8. In another implementation, the storage node includes a plurality of NVMe storage devices. To distinguish between start addresses of queues of different NVMe storage devices in a same storage node, the queue information further includes identifiers of the NVMe storage devices, and the mapping relationship established by the management server further includes the identifiers of the NVMe storage devices. The queue information deletion message sent to the management server by the storage node includes the identifier of the NVMe storage device. The management server deletes a mapping relationship including the identifier of the NVMe storage device. In another implementation, when a new NVMe storage device is installed to the storage node 1, the storage node 1 allocates a memory address in the memory to a queue of the new NVMe storage device, and performs the procedure shown in FIG. 7. Details are not described herein again.

In this embodiment of the present invention, the storage node locally stores a table shown in FIG. 12, to record a mapping relationship between an identifier of an NVMe storage device in the storage node and a start address of a queue of the NVMe storage device. For a description of the identifier of the NVMe storage device in FIG. 12, refer to the descriptions in FIG. 8 to FIG. 11. Details are not described herein again. In this embodiment of the present invention, the tables in FIG. 8 to FIG. 12, as an example data structure, may have a plurality of specific implementations, for example, may exist in an index manner and may further exist in a multi-level index manner. For example, in the tables shown in FIG. 8 to FIG. 11, a first-level index is a storage node identifier, and is used to search for an identifier of a corresponding NVMe storage device; and a second-level index is an NVMe storage device identifier, and is used to search for the start address of the queue of the NVMe storage device.

As described above, the client accesses the storage system, and determines, based on a storage address included in an access request, a logical address that is of an NVMe storage device and that corresponds to the storage address. For example, the client sends a write request. During specific implementation, the client may access a partition view stored by the client, or query a partition view in the management server. For example, the client determines that the storage address corresponds to the logical address L1 of the NVMe storage device 1 in the storage node 1, the logical address L2 of the NVMe storage device 2 in the storage node 2, the logical address L3 of the NVMe storage device 3 in the storage node 3, and the logical address L4 of the NVMe storage device 4 in the storage node 4. To be specific, the NVMe storage device 1, the NVMe storage device 2, the NVMe storage device 3, and the NVMe storage device 4 form a multi-copying stripe relationship. To obtain the start address of the queue of the NVMe storage device that provides the logical address, the client sends a query request to the management server, where the query request includes the identifier of the storage node. When the storage node includes a plurality of NVMe storage devices, the query request further includes identifiers of the NVMe storage devices. For example, the query request includes the following several groups of identifiers: the identifier N1 of the storage node 1 and the identifier D11 of the NVMe storage device 1, the identifier N2 of the storage node 2 and the identifier D21 of the NVMe storage device 2, the identifier N3 of the storage node 3 and the identifier D31 of the NVMe storage device 3, and the identifier N4 of the storage node 4 and the identifier D41 of the NVMe storage device 4. With reference to FIG. 8, the management server receives the query request from the client, queries a mapping relationship recorded in the entries, and sends a query request response to the client. The response includes the start address Add1 of the queue of the NVMe storage device 1 in the storage node 1, a start address Addk of a queue of the NVMe storage device 2 in the storage node 2, a start address Addy of a queue of the NVMe storage device 3 in the storage node 3, and a start address Addz of a queue of the NVMe storage device 4 in the storage node 4. In this embodiment of the present invention, a start address, of a queue, included in the query request response that is sent to the client by the management server includes a start address of an SQ, and may further include a start address of a CQ. The client communicates with the management server, and may obtain start addresses of queues of the plurality of NVMe storage devices at a time, so as to reduce a quantity of times of communication interaction.

The management server establishes a lock identifier. The lock identifier is used to lock the start addresses Add1, Addk, Addy, and Addz. Once a start address of a storage queue is locked, it indicates that the queue has been allocated to the client. Therefore, it may also be described as follows: The lock identifier is used to lock a mapping relationship between an identifier of a storage node and a start address of a queue. During specific implementation, the lock identifier may be a flag bit. For example, 0 is used to indicate that the mapping relationship is locked, and 1 is used to indicate that the mapping relationship is not locked. The lock identifier may be recorded in the entries shown in FIG. 8. Further, the management server may further record an identifier of a client that obtains a queue. The identifier may be a number allocated to each client by the management server, or may be hardware information of the client, for example, interface card hardware information, or may be address information of the client, for example, an IP address.

In this embodiment of the present invention, the management server may collect statistics about load of an NVMe storage device based on lock information of a start address of a queue of the NVMe storage device, and dynamically determine a mapping relationship between a storage address and a logical address of the NVMe storage device based on the load of the NVMe storage device, thereby implementing load balancing of the storage system. The dynamically determining a mapping relationship between a storage address and a logical address of the NVMe storage device based on the load of the NVMe storage device means that the mapping relationship between the storage address and the logical address of the NVMe storage device is not established during initialization of the storage system, but is established when the client receives a write request, so as to determine the logical address that is of the NVMe storage device and to which the storage address in the write request is mapped. In an implementation, when the client queries an NVMe storage address to which the storage address in the write request is mapped, the management server determines the logical address of the NVMe storage device based on the load of the NVMe storage device in the storage system. In another implementation, the management server determines a partition view, for example, a mapping relationship between a partition and a storage node, based on the load of the NVMe storage device in the storage system. Specifically, statistics about the load of the NVMe storage device may be collected based on the lock information of the start address of the queue of the NVMe storage device.

Figure 13:
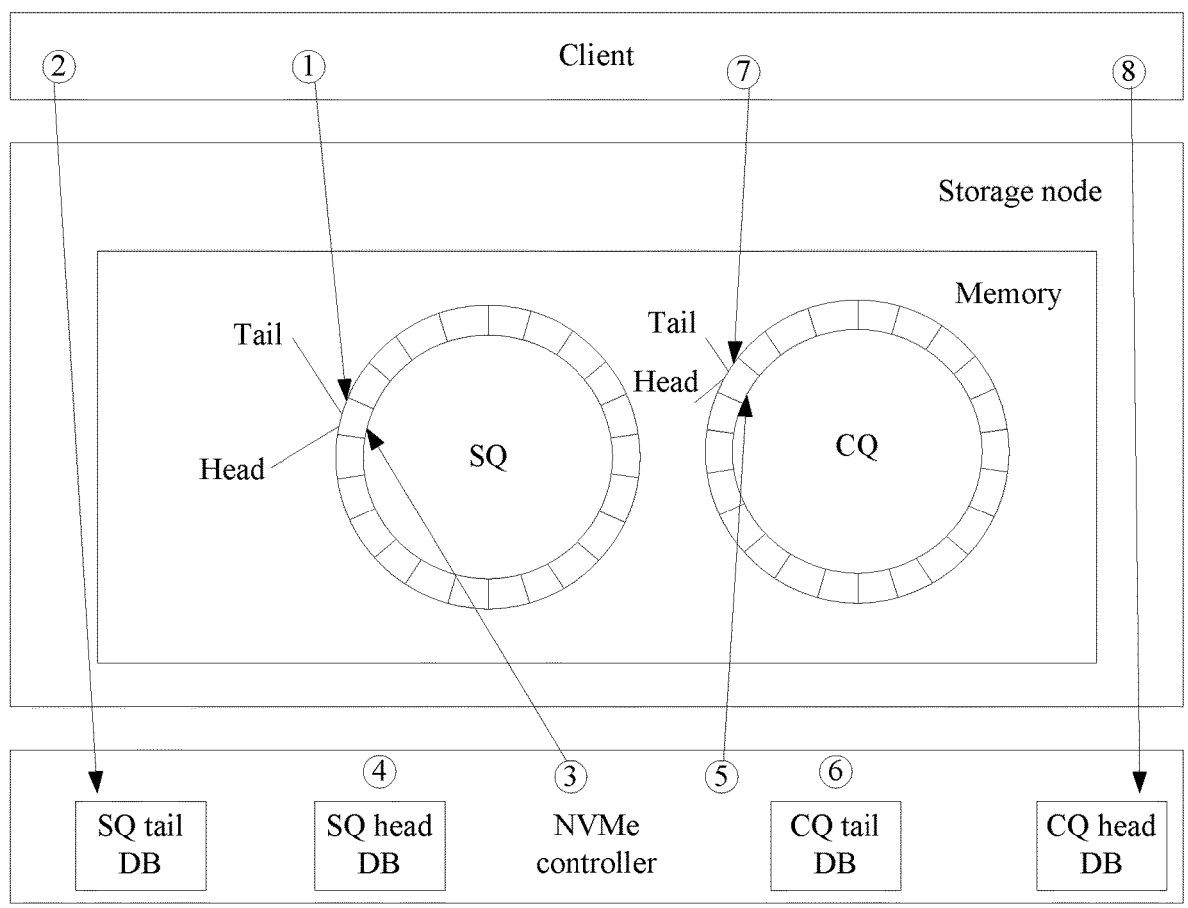
FIG. 13 is a schematic diagram of an access request processing procedure according to an embodiment of the present invention.

The client sends RDMA write requests to the storage node 1, the storage node 2, the storage node 3, and the storage node 4, respectively. The RDMA write request sent to the storage node 1 includes L1 and Add1; the RDMA write request sent to the storage node 2 includes L2 and Addk; the RDMA write request sent to the storage node 3 includes L3 and Addy; and the RDMA write request sent to the storage node 4 includes L4 and Addz. For that the client sends RDMA write requests to the storage node 1, the storage node 2, the storage node 3, and the storage node 4, respectively, refer to the foregoing description in this embodiment of the present invention. In this embodiment of the present invention, that the client sends the RDMA write request to the storage node 1 is used as an example for description. The client sends the RDMA write request to an interface card of the storage node 1. The interface card of the storage node 1 receives the RDMA write request, and sends, to the memory address Add1 of the storage node 1, the logical address L1 and data that is to be written into L1 and that is in a write request received by the client. As shown in FIG. 13, an SQ and a CQ are empty. To be specific, an initial head address and an initial tail address of the SQ are the same, and an initial head address and an initial tail address of the CQ are the same. A specific operation process is shown in FIG. 13.

(1). The client sends a write request to a tail of the SQ.

The client sends an RDMA write request to the storage node 1, where the RDMA write request includes L1 and the start address Add1 of the queue, and further includes data that is to be written into L1 and that is in a write request received by the client. The interface card of the storage node 1 receives the RDMA write request, and obtains L1 and Add1. For example, Add1 is 0. As described above, in this embodiment of the present invention, the start address Add1 of the queue includes the start address of the SQ. In another implementation, the start address Add1 of the queue may further include the start address of the CQ. An initial value of an SQ tail DB is 0, and an initial value of a CQ tail DB is 0. The interface card of the storage node 1 sends, to the start address of the SQ, L1 and the data that is to be written into L1 and that is in the write request received by the client. The RDMA write request is one command.

(2). The client updates an SQ tail DB.

The client writes one RDMA write request into the SQ, and the tail of the SQ becomes 1. After writing one RDMA write request command into the SQ, the client updates a value of the SQ tail DB in the NVMe controller to 1. When the client updates the SQ tail DB, the NVMe controller is notified at the same time that a write request needs to be executed.

(3). The NVMe controller obtains the write request from the SQ, and executes the write request.

The client updates the SQ tail DB, and the NVMe controller receives a notification, obtains the write request from the SQ, and executes the write request.

(4). The NVMe controller updates an SQ head DB.

After the NVMe controller finishes execution of the write request in the SQ, a head of the SQ also becomes 1, and the NVMe controller writes the head of the SQ into the SQ head DB.

(5). The NVMe controller writes a write request execution result into the CQ.

The NVMe controller executes the write request, and writes the write request execution result into a tail of the CQ.

(6). The client updates a CQ tail DB.

The NVMe controller executes the write request, writes the write request execution result into the tail of the CQ, and updates a value of the CQ tail DB to 1.

(7). The client obtains the write request execution result.

During specific implementation, the client may obtain the write request execution result from the CQ in a round-robin manner.

(8). The NVMe controller updates a CQ head DB.

The client writes an address of the head of the CQ into the CQ head DB, and a value of the CQ head DB is 1.

In another implementation of an access request processing procedure in this embodiment of the present invention, steps (2) and (6) in FIG. 13 may alternatively be implemented by using an interface card of the storage node.

As shown in FIG. 12, the storage node records the mapping relationship between the identifier of the NVMe storage device in the storage node and the start address of the queue of the NVMe storage device. For specific implementation in which the client accesses the storage system, and the client determines, based on the storage address included in the access request, the logical address that is of the NVMe storage device and that corresponds to the storage address, refer to the foregoing description. For example, the client determines that the storage address corresponds to the logical address L1 of the NVMe storage device 1 in the storage node 1, the logical address L2 of the NVMe storage device 2 in the storage node 2, the logical address L3 of the NVMe storage device 3 in the storage node 3, and the logical address L4 of the NVMe storage device 4 in the storage node 4. To be specific, the NVMe storage device 1, the NVMe storage device 2, the NVMe storage device 3, and the NVMe storage device 4 form a multi-copying stripe relationship. In another implementation, the client separately sends a query request to the storage node 1, the storage node 2, the storage node 3, and the storage node 4. The query request includes an identifier of an NVMe storage device. With reference to FIG. 12, the storage node 1 receives the query request from the client, queries a mapping relationship recorded in an entry, and sends a query request response to the client. The response includes the start address Add1 of the queue of the NVMe storage device 1 in the storage node 1. The storage node 2, the storage node 3, and the storage node 4 each execute a query operation based on the query request, and send a query request response to the client. The storage node 1 is still used as an example. The storage node 1 establishes a lock identifier. The lock identifier is used to lock the start address Add1 of the queue. Once the start address of the queue is locked, it indicates that the queue has been allocated to the client. During specific implementation, the lock identifier may be a marker bit. For example, 0 is used to indicate that the mapping relationship is locked, and 1 is used to indicate that the mapping relationship is not locked. The lock identifier may be recorded in entries shown in FIG. 12. In this implementation, the client sends the query request to the storage node, so that load of the management server can be reduced. The client receives the query request response from the storage node, and performs an operation shown in FIG. 13.

In another implementation in this embodiment of the present invention, the NVMe storage devices form an EC stripe relationship. The client may also access the NVMe storage device in the foregoing two manners. Details are not described herein again.

In this embodiment of the present invention, the client obtains a start address of a queue of an NVMe storage device; before releasing the queue of the NVMe storage device, the client sends, based on a quantity of received access requests and the start address of the queue, an RDMA access request to the queue of the NVMe storage device based on a change of the start address of the queue of the NVMe storage device, and obtains an access request execution result from a CQ of the NVMe storage device.

In this embodiment of the present invention, the client can directly send the RDMA request to the NVMe storage device in the storage node in the storage system, and participation of a CPU of the storage node is not needed. Therefore, performance of the NVMe storage device is brought into full play.

Figure 14:
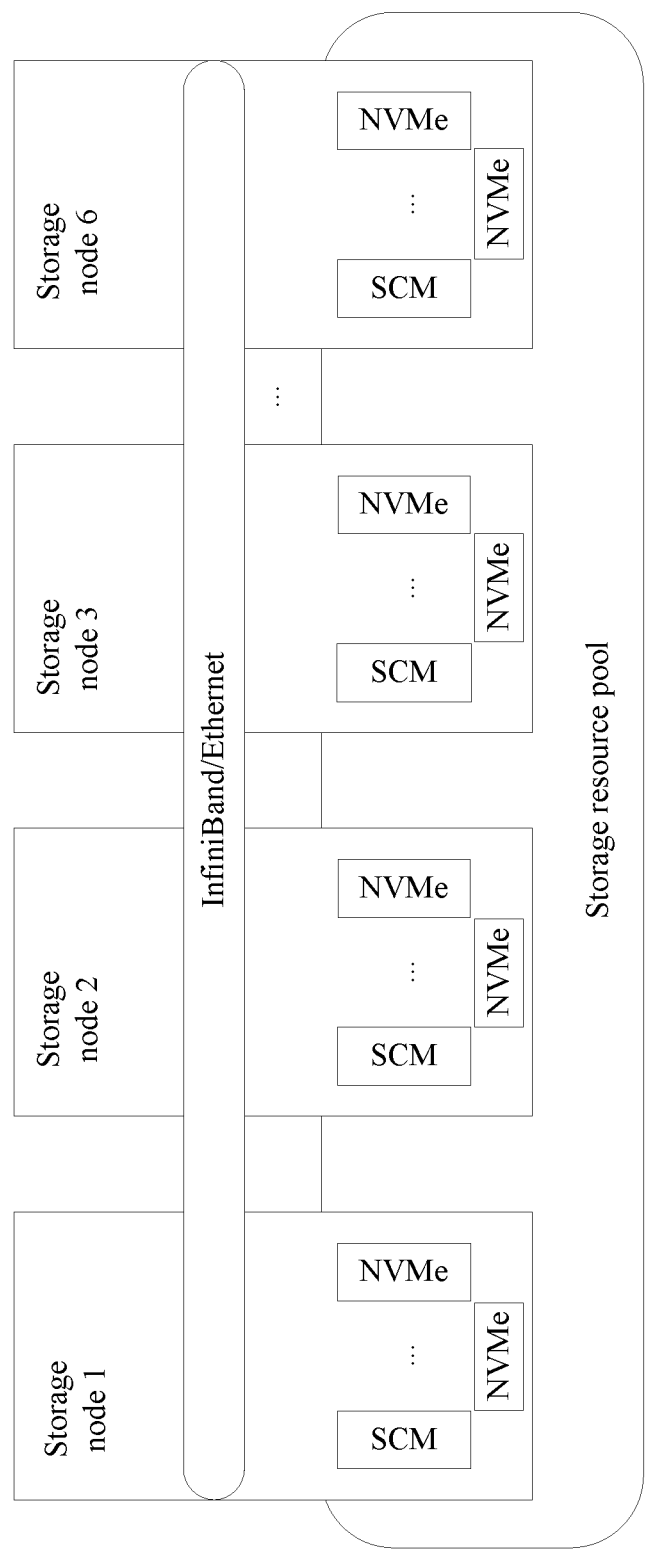
FIG. 14 is a schematic diagram of a distributed block storage system according to an embodiment of the present invention.

The NVMe storage device is applied to this embodiment of the present invention; in addition, with development of the storage device, the storage system uses a plurality of quasi-storage devices to improve performance of the storage system. For example, a storage device of a storage class memory (SCM) features both persistence and fast byte-level access. Currently, a relatively popular SCM storage device mainly includes a phase-change memory (PCM), a resistive random access memory (ReRAM), a magnetic random access memory, a carbon nanotube random access memory (Nantero's CNT Random Access Memory), or the like. As shown in FIG. 14, in a distributed block storage system in this embodiment of the present invention, each storage node includes one or more NVMe storage devices, for example, a SSD that supports the NVMe interface specification, and further includes one or more SCM storage devices. In another implementation, some storage nodes include one or more NVMe storage devices, and some storage nodes include one or more SCM storage devices.

In the distributed block storage system shown in FIG. 14, logical addresses of the NVMe storage devices are grouped into a resource pool, and the SCM storage devices are grouped into a resource pool. A storage address in an access request received by the client is mapped to the logical address provided by the NVMe storage device. For specific implementation, refer to descriptions in the foregoing embodiment. A manner of mapping a storage address in an access request received by the client to an address provided by a storage device may be indicated as: the storage address-the NVMe storage device-the logical address, or the storage address-the SCM storage device-a base address.

Based on the distributed block storage system shown in FIG. 14, a plurality of copies of data may be stored on different types of storage devices. For example, one copy is stored on an SCM storage device, and one or more copies are stored on an NVMe storage device. Alternatively, one copy is stored on an SCM storage device, and one copy is stored on a plurality of NVMe storage devices in a form of an EC stripe. When reading data, the client obtains the data from the SCM storage device, thereby improving read performance.

In this embodiment of the present invention, that one copy is stored on an SCM storage device and two copies are stored on an NVMe storage device is used as an example for description. Data in a write request received by the client is mapped to a base address of one SCM storage device and logical addresses of two NVMe storage devices. As described above, during specific implementation, mapping from a storage address in the write request to the base address provided by the SCM storage device and mapping from the storage address in the write request to the logical address of the NVMe storage device may be based on the partition views shown in FIG. 3 and FIG. 4, or may be direct mapping from the storage address in the write request to the base address provided by the SCM storage device and direct mapping from the storage address in the write request to the logical address of the NVMe storage device.

Figure 15:
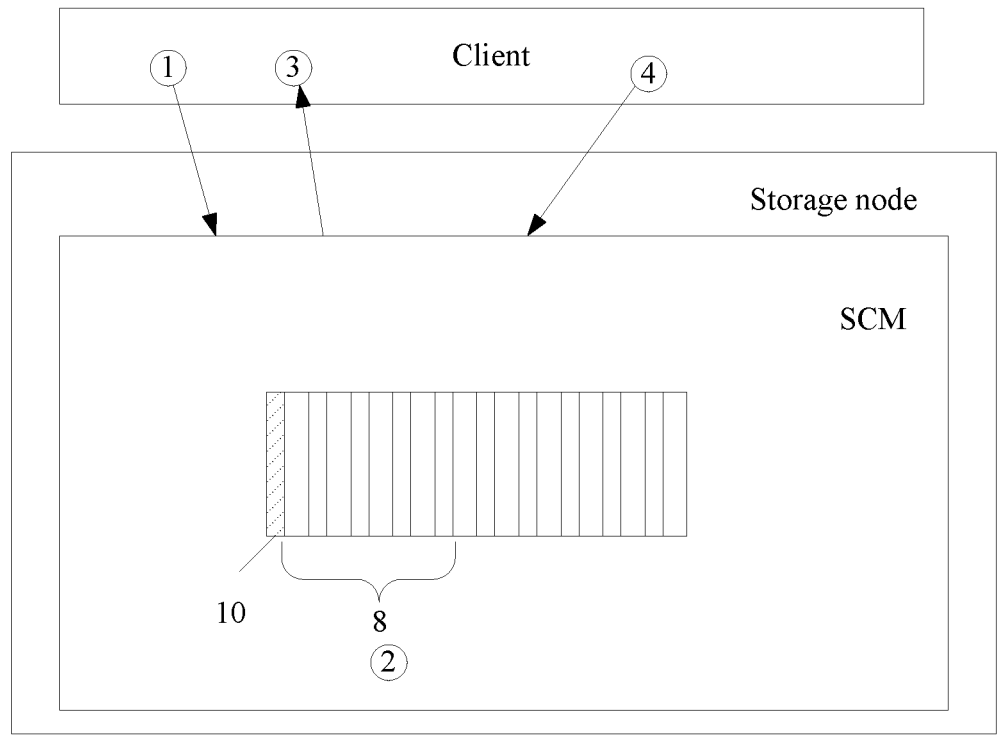
FIG. 15 is a schematic diagram of sending an RDMA write request to a storage class memory device by a client according to an embodiment of the present invention.

Further, the client receives the access request, and determines, based on a storage address in the access request, the base address that is of the SCM storage device and to which the storage address is mapped, and the logical address that is of the NVMe storage device and to which the storage address is mapped. In this embodiment of the present invention, the client determines the logical address that is of the NVMe storage device and to which the storage address is mapped. For a subsequent access process, refer to the foregoing process in which the client accesses the NVMe storage device. Details are not described herein again. As shown in FIG. 15, for example, a length of a copy is 8 bytes.

A process in which the client sends the RDMA write request to the SCM storage device is as follows.

(1). The client sends a fetch-and-add (fetch-and-add (ptr, 8)) command to the storage node.

Fetch-and-add (ptr, len value) is an RDMA atomic operation instruction, and is used to obtain an end address of currently allocated storage space and a length of to-be-written data. len value indicates the length of the to-be-written data. In this embodiment of the present invention, the end address of the currently allocated storage space is 10, and len value is 8 bytes.

(2). The storage node allocates a storage address whose length is 8 bytes to the client.

The storage node receives the fetch-and-add (ptr, 8) command, and reserves a storage address 11-18 for the client.

(3). The storage node returns an end address of currently allocated storage space to the client.

(4). The client sends the RDMA write request to the storage node. The RDMA write request includes data whose length is 8 bytes and the end address (base address) 10 of the currently allocated storage space.

With reference to the storage system shown in FIG. 1, in another implementation, the storage node may further include a mechanical hard disk. Each storage node includes one or more NVMe storage devices, for example, a SSD that supports the NVMe interface specification, and further includes one or more mechanical hard disks. In another implementation, some storage nodes include one or more NVMe storage devices, and some storage nodes include one or more mechanical hard disks. A plurality of copies of data may be stored on different types of storage devices. For example, one copy is stored on an NVMe storage device, and one or more copies are stored on a mechanical hard disk. Alternatively, one copy is stored on an NVMe storage device, and one copy is stored on a plurality of mechanical hard disks in a form of an EC stripe. When reading data, the client obtains the data from the NVMe storage device, thereby improving read performance. For a specific access process, refer to descriptions in the foregoing embodiments of the present invention. Details are not described herein again. A write request sent to the mechanical hard disk by the client includes a logical address that is of the mechanical hard disk and to which a storage address in a write request received by the client is mapped. The write request sent to the mechanical hard disk by the client may alternatively be an RDMA request.

In the foregoing embodiments of the present invention, that the client sends the RDMA write request to the NVMe storage device and the SCM storage device in the storage node is used as an example for description. The solutions in the embodiments of the present invention may also be applied to a scenario of sending an RDMA read request to the NVMe storage device and the SCM storage device in the storage node, and the like. This is not limited in this embodiment of the present invention. To be specific, in this embodiment of the present invention, the client may send the RDMA access request to the NVMe storage device and the SCM storage device that are in the storage node. In this embodiment of the present invention, the storage address included in the access request received by the client may correspond to logical addresses (or base addresses) of a plurality of storage devices. Therefore, for one of the storage devices, it indicates that the storage address is mapped to the logical address (or the base address) of the storage device.

Figure 16:
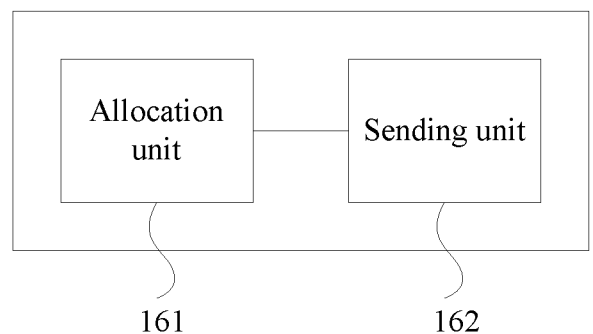
FIG. 16 is a schematic structural diagram of a storage node according to an embodiment of the present invention.

Based on descriptions in the foregoing embodiments of the present invention, as shown in FIG. 16, an embodiment of the present invention further provides a storage node applied to a storage system. The storage system further includes a management server. The storage node includes a first storage device that supports the NVMe interface specification. The storage node includes an allocation unit 161 and a sending unit 162. The allocation unit 161 is configured to allocate a first memory address in a memory to a start address of a queue of the first storage device. The sending unit 162 is configured to send a first queue message to the management server, where the first queue message includes an identifier of the storage node and the first memory address. Further, the storage node further includes a detection unit, configured to detect that the first storage device is installed to the storage node. Further, the detection unit is further configured to detect that the first storage device is removed from the storage node. The sending unit 162 is further configured to send a queue information deletion message to the management server, where the queue information deletion message includes the first memory address.

Figure 17:
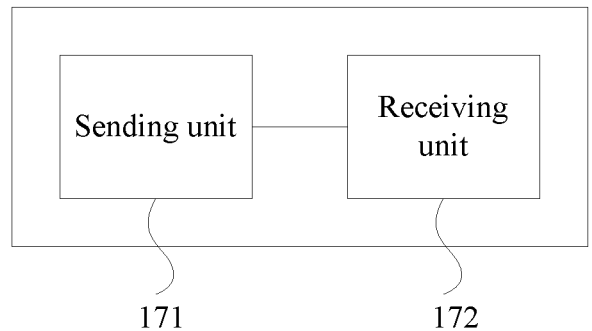
FIG. 17 is a schematic structural diagram of a client according to an embodiment of the present invention.

Corresponding to the storage node shown in FIG. 16, as shown in FIG. 17, an embodiment of the present invention further provides a client applied to a storage system. The storage system includes a management server and a first storage node. The first storage node includes a first storage device that supports the NVMe interface specification, and a start address of a queue of the first storage device is stored in a first memory address in a first memory of the first storage node. The management server stores a first mapping relationship between an identifier of the first storage node and the first memory address. The client includes a sending unit 171 and a receiving unit 172. The sending unit 171 is configured to send a query request to the management server, where the query request includes the identifier of the first storage node. The receiving unit 172 is configured to receive a query request response from the management server, where the query request response includes the first memory address that is determined by the management server based on the first mapping relationship. Further, the sending unit 171 is further configured to send a first remote direct memory access request to the first storage node, where the first remote direct memory access request includes the first memory address. Further, the storage system further includes a second storage node, the second storage node includes a second storage device that supports the NVMe interface specification, and a start address of a queue of the second storage device is located in a second memory address in a second memory of the second storage node. The management server stores a second mapping relationship between an identifier of the second storage node and the second memory address. The query request includes the identifier of the second storage node. The query request response includes the second memory address that is determined by the management server based on the second mapping relationship. The first storage device and the second storage device form a stripe relationship. The sending unit 171 is further configured to send a second remote direct memory access request to the second storage node, where the second remote direct memory access request includes the second memory address.

Figure 18:
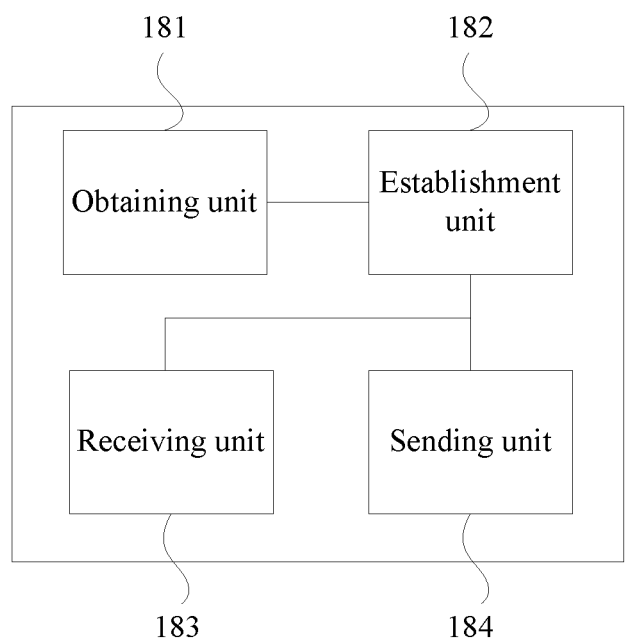
FIG. 18 is a schematic structural diagram of a management server according to an embodiment of the present invention.

Corresponding to FIG. 16 and FIG. 17, an embodiment shown in FIG. 18 provides a management server in a storage system. The storage system includes the management server and a first storage node, the first storage node includes a first storage device that supports the NVMe interface specification, and a start address of a queue of the first storage device is located in a first memory address in a first memory of the first storage node. The management server includes an obtaining unit 181, an establishment unit 182, a receiving unit 183, and a sending unit 184. The obtaining unit 181 is configured to obtain a first queue message from the first storage node, where the first queue message includes an identifier of the first storage node and the first memory address. The establishment unit 182 is configured to establish a first mapping relationship between the identifier of the first storage node and the first memory address. The receiving unit 183 is configured to receive a query request from a client, where the query request includes the identifier of the first storage node. The sending unit 184 is configured to send a query request response to the client based on the first mapping relationship, where the query request response includes the first memory address. Further, the establishment unit 182 is further configured to establish a lock identifier, where the lock identifier is used to lock the first memory address. Further, the storage system further includes a second storage node, the second storage node includes a second storage device that supports the NVMe interface specification, and a start address of a queue of the second storage device is located in a second memory address in a second memory of the second storage node. The obtaining unit 181 is further configured to obtain a second queue message of the second storage device from the second storage node, where the second queue message includes an identifier of the second storage node and the second memory address. The establishment unit 182 is further configured to establish a second mapping relationship between the identifier of the second storage node and the second memory address. Further, the obtaining unit 181 is further configured to obtain a third queue message from the first storage node, where the third queue message includes the identifier of the first storage node and a third memory address. The establishment unit 182 is further configured to establish a third mapping relationship between the identifier of the first storage node and the third memory address. A start address of a queue of a third storage device that supports the NVMe interface specification is located in the third memory address in the first memory, and the third storage device is a newly added storage device in the first storage node. Further, the receiving unit 183 is further configured to receive a queue information deletion message from the second storage node, where the queue information deletion message includes the second memory address. The management server further includes a deletion unit, configured to delete the second mapping relationship. Further, the management server further includes a detection unit and a deletion unit. The detection unit is configured to detect that communication with the first storage node is interrupted. The deletion unit is configured to delete the first mapping relationship. Further, the detection unit is specifically configured to detect that a heartbeat of the first storage node is not received within a predetermined time.

Figure 19:
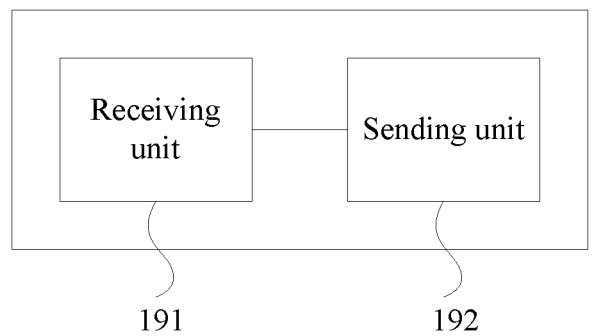
FIG. 19 is a schematic structural diagram of a management server according to an embodiment of the present invention.

As shown in FIG. 19, an embodiment of the present invention further provides a management server in a storage system. The storage system further includes a first storage node and a second storage node. The first storage node includes a first storage device that supports the NVMe interface specification, and a start address of a queue of the first storage device is located in a first memory address in a first memory of the first storage node. The second storage node includes a second storage device that supports the NVMe interface specification, and a start address of a queue of the second storage device is located in a second memory address in a second memory of the second storage node. The management server stores a mapping table, where the mapping table includes a first mapping relationship between an identifier of the first storage node and the first memory address, and a second mapping relationship between an identifier of the second storage node and the second memory address. The management server includes a receiving unit 191 and a sending unit 192. The receiving unit 191 is configured to receive a query request from a client, where the query request includes the identifier of the first storage node and the identifier of the second storage node. The sending unit 192 is configured to send a query request response to the client based on the mapping table, where the query request response includes the first memory address and the second memory address. Further, the management server further includes an obtaining unit and an establishment unit. The obtaining unit is configured to obtain a first queue message from the first storage node and obtain a second queue message from the second storage node, where the first queue message includes the identifier of the first storage node and the first memory address, and the second queue message includes the identifier of the second storage node and the second memory address. The establishment unit is configured to establish the first mapping relationship and the second mapping relationship. Further, the establishment unit is further configured to establish a lock identifier, where the lock identifier is used to lock the first mapping relationship and the second mapping relationship. Further, the obtaining unit is further configured to obtain a third queue message from the first storage node, where the third queue message includes the identifier of the first storage node and a third memory address. The establishment unit is further configured to establish a third mapping relationship between the identifier of the first storage node and the third memory address, where a start address of a queue of a third storage device that supports the NVMe interface specification is located in the third memory address in the first memory, and the third storage device is a newly added storage device in the first storage node. Further, the management server further includes a deletion unit. The receiving unit 191 is further configured to receive a queue information deletion message from the second storage node, where the queue information deletion message includes the second memory address. The deletion unit is configured to delete the second mapping relationship from the mapping table. Further, the management server further includes a detection unit and a deletion unit. The detection unit is configured to detect that communication with the first storage node is interrupted. The deletion unit is configured to delete the first mapping relationship. Further, the detection unit is specifically configured to detect that a heartbeat of the first storage node is not received within a predetermined time.

Figure 20:
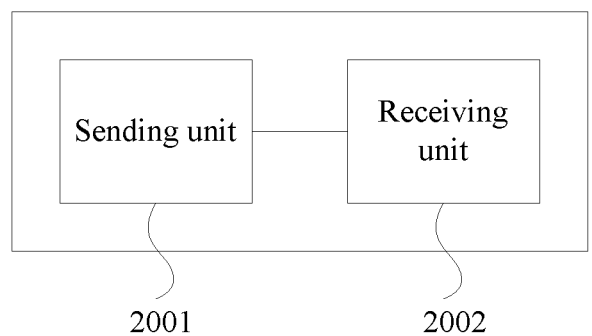
FIG. 20 is a schematic structural diagram of a client according to an embodiment of the present invention.

Corresponding to the management server described in FIG. 19, FIG. 20 shows a client in a storage system according to an embodiment of the present invention. The storage system includes a management server, a first storage node, and a second storage node. The first storage node includes a first storage device that supports the NVMe interface specification, and a start address of a queue of the first storage device is located in a first memory address in a first memory of the first storage node. The second storage node includes a second storage device that supports the NVMe interface specification, and a start address of a queue of the second storage device is located in a second memory address in a second memory of the second storage node. The management server stores a mapping table, where the mapping table includes a first mapping relationship between an identifier of the first storage node and the first memory address, and a second mapping relationship between an identifier of the second storage node and the second memory address. The client includes a sending unit 2001 and a receiving unit 2002. The sending unit 2001 is configured to send a query request to the management server, where the query request includes the identifier of the first storage node and the identifier of the second storage node. The receiving unit 2002 is configured to receive a query request response from the management server, where the query request response includes the first memory address and the second memory address that are determined by the management server based on the mapping table. Further, the sending unit 2002 is further configured to send a first remote direct memory access request to the first storage node, and send a second remote direct memory access request to the second storage node, where the first remote direct memory access request includes the first memory address, and the second remote direct memory access request includes the second memory address.

Figure 21:
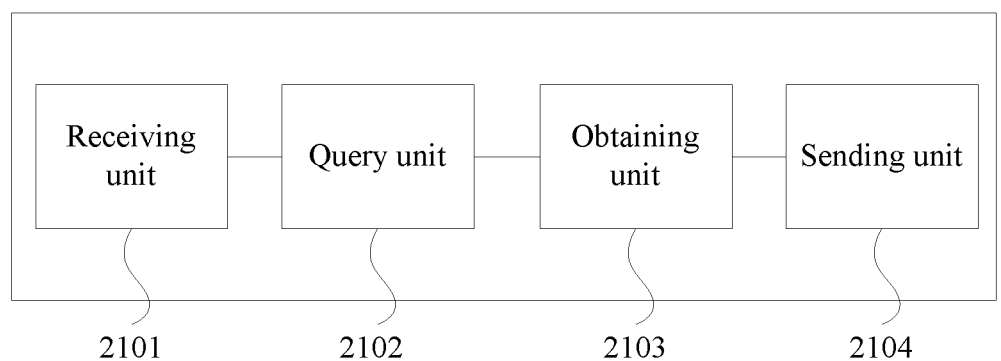
FIG. 21 is a schematic structural diagram of a client according to an embodiment of the present invention.

As shown in FIG. 21, an embodiment of the present invention provides another client in a storage system. The storage system includes a first storage node. The first storage node includes a first storage device that supports the NVMe interface specification, and a start address of a queue of the first storage device is located in a first memory address in a first memory of the first storage node. The client includes a receiving unit 2101, a query unit 2102, an obtaining unit 2103, and a sending unit 2104. The receiving unit 2101 is configured to receive a write request, where the write request includes a storage address. The query unit 2102 is configured to query a mapping relationship of the storage address, where the mapping relationship of the storage address includes mapping of the storage address to a first logical address of the first storage device in the first storage node. The obtaining unit 2103 is configured to obtain the first memory address in which the start address of the queue of the first storage device is located. The sending unit 2104 is configured to send a first remote direct memory access write request to the first storage node, where the first remote direct memory access write request includes the first memory address and the first logical address. Further, the storage system further includes a management server. The management server stores a mapping relationship between an identifier of the first storage node and the first memory address. The obtaining unit 2103 is specifically configured to: send a first query request to the management server, where the first query request includes the identifier of the first storage node; and receive a first query request response from the management server, where the first query request response includes the first memory address. Further, the obtaining unit 2103 is specifically configured to: send a second query request to the first storage node, where the second query request includes the identifier of the first storage device; and receive a second query request response from the first storage node, where the second query request response includes the first memory address. Further, the storage system further includes a second storage node. The second storage node includes a second storage device of a storage class memory. The mapping relationship of the storage address includes mapping of the storage address to a first base address of the second storage device. The sending unit 2104 is further configured to send a second remote direct memory access write request to the second storage node, where the second remote direct memory access write request includes the first base address. Further, the storage system further includes a third storage node. The third storage node includes a third storage device. The mapping relationship of the storage address includes mapping of the storage address to a third logical address of the third storage device. The third storage device is a mechanical hard disk. The sending unit 2104 is further configured to send a third write request to the third storage node, where the third write request includes the third logical address. Further, the storage system includes a fourth storage node. The fourth storage node includes a fourth storage device that supports the NVMe interface specification, and a start address of a queue of the fourth storage device is located in a third memory address in a third memory of the fourth storage node. The mapping relationship of the storage address includes mapping of the storage address to a fourth logical address of the fourth storage device. The obtaining unit 2101 is further configured to obtain the third memory address in which the start address of the queue of the fourth storage device is located. The sending unit 2104 is further configured to send a fourth remote direct memory access write request to the first storage node, where the fourth remote direct memory access write request includes the third memory address and the fourth logical address.

In this embodiment of the present invention, a memory address, located in a memory, of a start address of a queue has the same meaning as a start address, in a memory, of a queue. The foregoing description is also referred to as follows: A start address, in a memory, of a queue is located in a memory address in the memory.

For implementation of the management server, the storage node, and the client in this embodiment of the present invention, refer to the foregoing descriptions of the management server, the storage node, and the client in the foregoing embodiments of the present invention. Specifically, the apparatus in the embodiments of the present invention may be a software module, and may run on a server, so that the server completes the implementations described in the embodiments of the present invention. Alternatively, the apparatus may be a hardware device. For details, refer to the structure shown in FIG. 2. Units of the apparatus may be implemented by the processor of the server described in FIG. 2.

Correspondingly, an embodiment of the present invention further provides a computer readable storage medium and a computer program product. The computer readable storage medium and the computer program product include a computer instruction, to implement the solutions described in the embodiments of the present invention.

In the embodiments of the present invention, EC and multi-copying are used as stripe algorithms. However, the stripe algorithm in the embodiments of the present invention is not limited to EC or multi-copying.

In the several embodiments provided in the present invention, it should be understood that the disclosed apparatus and method may be implemented in other manners. For example, the unit division in the described apparatus embodiment is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between apparatuses or units may be implemented electrically, mechanically, or in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions in the embodiments.

In addition, functional units in the embodiments of the present invention may be integrated into one processing unit, or each of the units may exist alone physically, or two or more units are integrated into one unit.

What is claimed is:

1. A method for accessing a storage system comprising a client, a storage node, and a management server, wherein the storage node comprises a memory and a storage device, the method comprising:
   receiving, by the client, a first access request comprising a storage address;
   identifying, by the client, a logical address of the storage device corresponding to the storage address in the first access request;
   querying, by the client, the management server regarding a mapping between the storage device and a start address of a submission queue (SQ) in the memory of the storage node;
   receiving, by the client, the start address of the SQ in the memory from the management server; and
   sending, by the client, a second access request directed to the start address of the SQ to a network interface card (NIC) of the storage node, wherein the second access request comprises the logical address of the storage device;
   receiving, by the storage node via the NIC, the second access request;
   sending, by the storage node via the NIC, the second access request to the start address of the SQ in the memory;
   obtaining, by the storage device, the second access request from the start address of the SQ in the memory;
   accessing, by the storage device, the logical address according to the second access request.

2. The method according to claim 1, prior to the step of the querying, further comprising:
   sending, by the storage node, a queue message to the management server, wherein the queue message comprises an identifier of the storage node and the start address of the SQ in the memory; and
   establishing, by the management server, the mapping between the start address of the SQ in the memory and the storage device.

3. The method according to claim 1, further comprising:
   allocating, by the management server, a lock identifier, for locking the start address of the SQ in the memory for the client.

4. The method according to claim 1, further comprising:
   receiving, by the management server, a queue information deletion message from the storage node, wherein the queue information deletion message comprises the start address of the SQ in the memory; and
   deleting, by the management server, the mapping between the start address of the SQ in the memory and the storage device.

5. The method according to claim 1, further comprising:
   detecting, by the management server, that communication with the storage node is interrupted; and
   deleting, by the management server, the mapping between the start address of the SQ in the memory and the storage device.

6. The method according to claim 5, wherein that the detecting, by the management server, that communication with the storage node is interrupted specifically comprises:

detecting, by the management server, that a heartbeat of the storage node is not received within a predetermined time.

7. A storage system comprising:
a management server;
a client; and
a storage node comprising a memory, a storage device, and a network interface card (NIC), wherein a submission queue (SQ) of the storage device is located in the memory of the storage node;
wherein the client is configured to:
  receive a first access request comprising a storage address;
  identify a logical address of the storage device corresponding to the storage address in the first access request;
  query the management server regarding a mapping between the storage device and the start address of the SQ in the memory of the storage node;
  receive the start address of the SQ in the memory from the management server; and
  send a second access request directed to the start address of the SQ to the NIC of the storage node, wherein the second access request comprises the logical address of the storage device;
the storage node is configured to:
  receive the second access request via the NIC; and
  send, via the NIC, the second access request to the start address of the SQ in the memory;
the storage device is configured to:
  obtain the second access request from the start address of the SQ in the memory;
  access the logical address according to the second access request;

the management server is configured to:
  store the mapping between the start address of the SQ in the memory and the storage device.

8. The storage system according to claim 7, wherein the storage node is configured to send a queue message to the management server, wherein the queue message comprises an identifier of the storage node and the start address of the SQ in the memory; and
  the management server is further configured to establish the mapping between the start address of the SQ in the memory and the storage device.

9. The storage system according to claim 7, wherein the management server is further configured to allocate a lock identifier, for locking the start address of the SQ in the memory for the client.

10. The storage system according to claim 7, wherein management server is further configured to:
  receive a queue information deletion message from the storage node, wherein the queue information deletion message comprises the start address of the SQ in the memory; and
  delete the mapping between the start address of the SQ in the memory and the storage device.

11. The storage system according to claim 7, wherein management server is further configured to:
  detect that communication with the storage node is interrupted; and
  delete the mapping between the start address of the SQ in the memory and the storage device.

12. The storage system according to claim 11, wherein management server is further configured to detect that a heartbeat of the storage node is not received within a predetermined time.

* * * * *